Sept. 22, 1959  W. S. PRAEG  2,905,062
MACHINE FOR PRODUCING BLENDED CURVED SURFACES ON THE
LONGITUDINALLY TAPERED, CURVED LEADING EDGES OF
BLADES USED IN JET ENGINES AND THE LIKE
Filed March 19, 1956  3 Sheets-Sheet 1
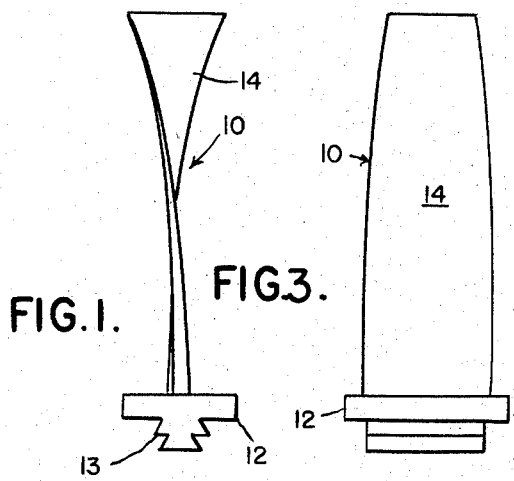
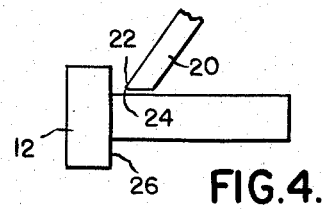
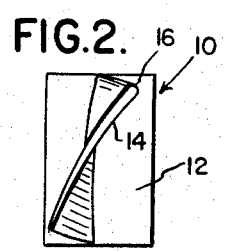
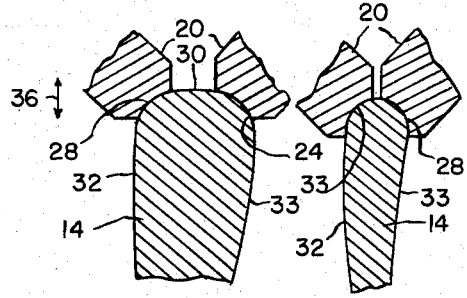
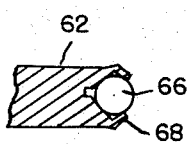
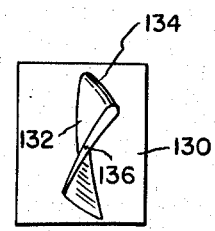
INVENTOR.
WALTER S. PRAEG
BY *Whittemore,*
*Hulbert & Belknap*
ATTORNEYS Sept. 22, 1959 W. S. PRAEG 2,905,062
MACHINE FOR PRODUCING BLENDED CURVED SURFACES ON THE
LONGITUDINALLY TAPERED, CURVED LEADING EDGES OF
BLADES USED IN JET ENGINES AND THE LIKE
Filed March 19, 1956 3 Sheets-Sheet 2
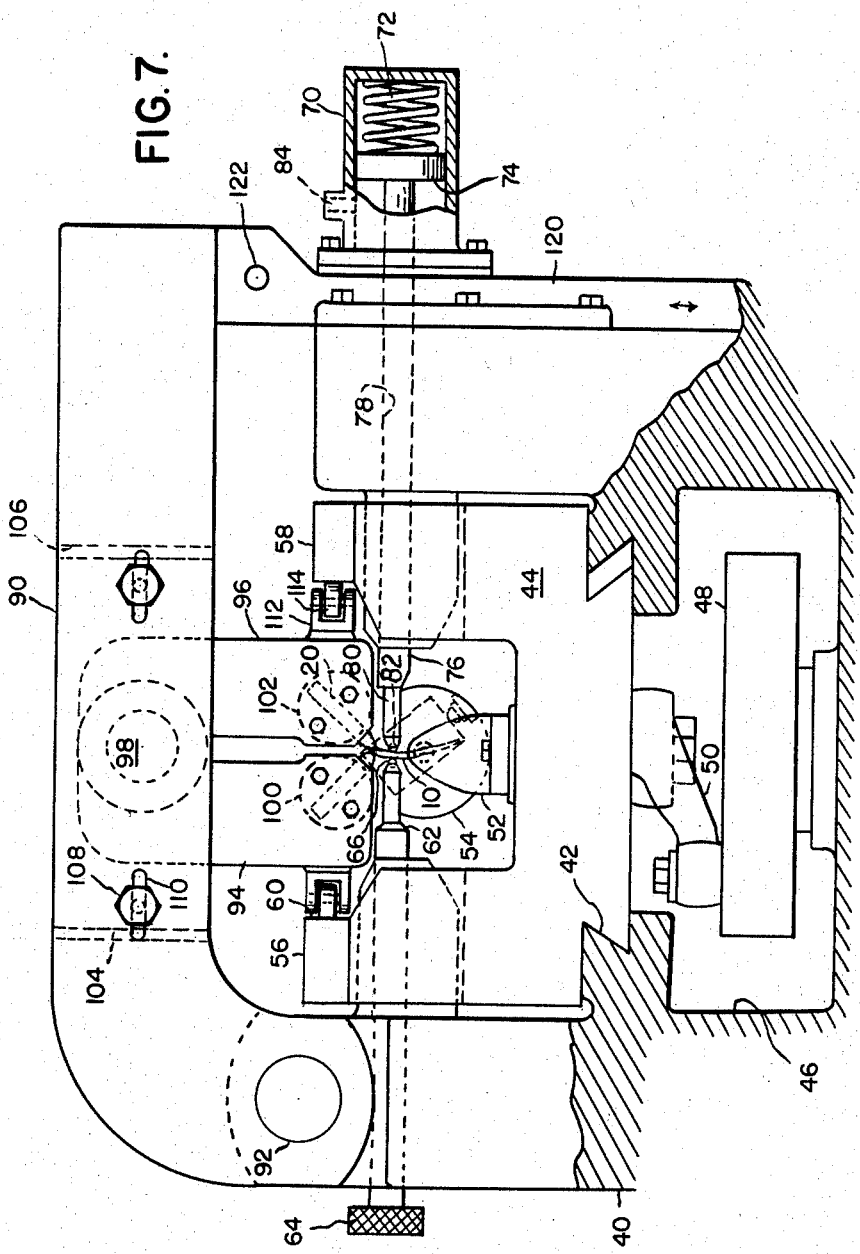
INVENTOR.
WALTER S. PRAEG
BY Whittemore,
Hulbert & Belknap
ATTORNEYS

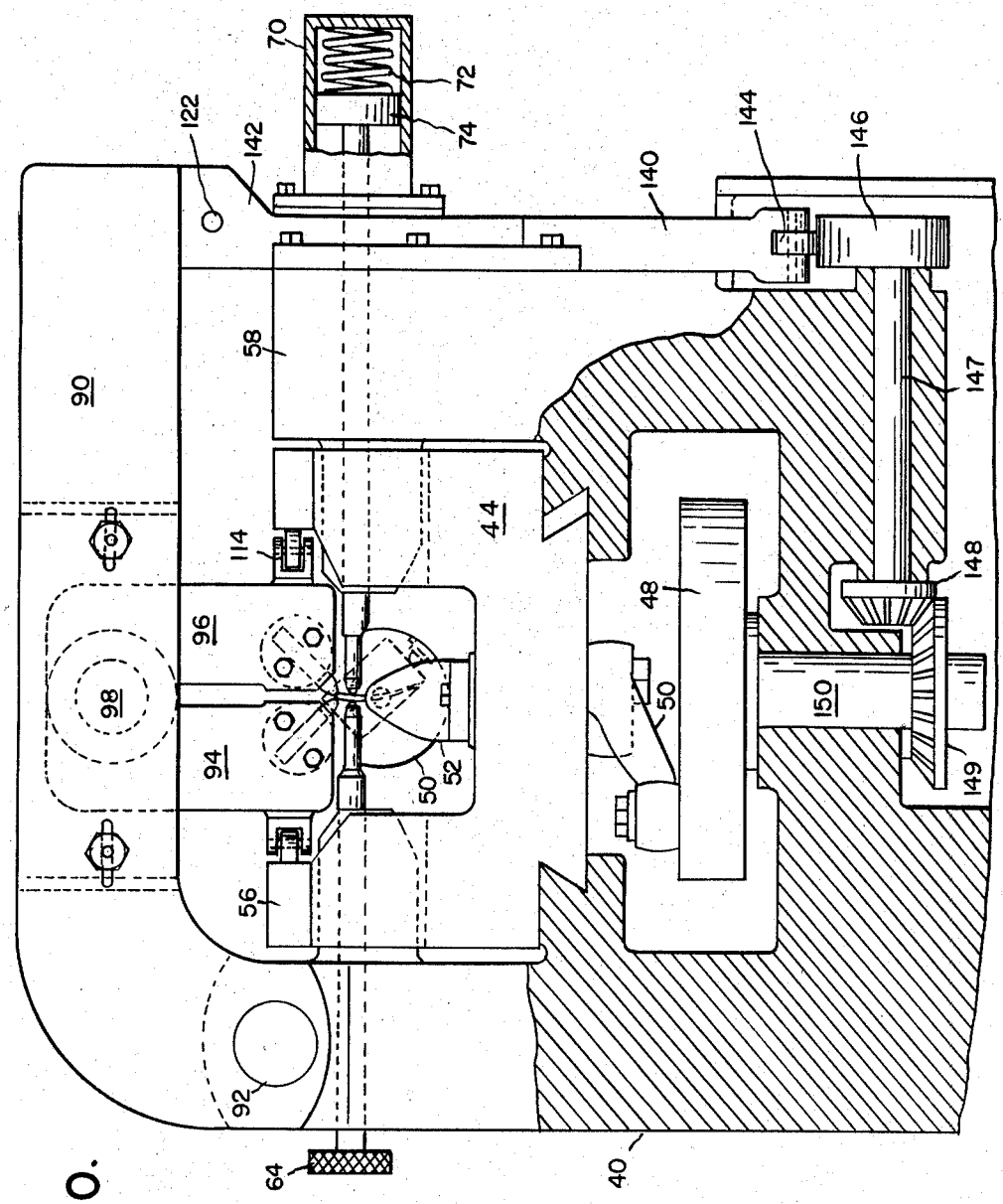

United States Patent Office 2,905,062
Patented Sept. 22, 1959

2,905,062

MACHINE FOR PRODUCING BLENDED CURVED SURFACES ON THE LONGITUDINALLY TAPERED, CURVED LEADING EDGES OF BLADES USED IN JET ENGINES AND THE LIKE

Walter S. Praeg, Detroit, Mich., assignor to National Broach & Machine Company, Detroit, Mich., a corporation of Michigan Application March 19, 1956, Serial No. 572,372

5 Claims. (Cl. 90—24.3)

The present invention relates to a machine for producing blended curved surfaces on the longitudinally tapered and curved leading edges of blades used in jet engines and the like.

It is an object of the present invention to provide apparatus for rounding the corners and producing smoothly blended curved surfaces at the leading edge of concavo convex longitudinally twisted blades.

More specifically, it is an object of the present invention to provide apparatus of the character described comprising means for supporting a pair of cutting tools having concave cutting edges for rounding the corners of the leading edge of the blades, means mounting the blades for rotation, means for effecting relative longitudinal reciprocation between the tools and the blades, means responsive to reciprocation for rotating the blades to maintain the leading edge portion thereof intermediate the tools, and means responsive to such reciprocation for effecting movement of the tools toward and away from each other to accommodate the tapered width of the blades.

Still more specifically, it is an object of the present invention to provide a machine of the character described comprising a base, a reciprocating slide on the base, a rotary work support on the slide having its axis of rotation disposed parallel to the direction of movement of the slide, a pivoted frame arm on the base, a pair of pivoted tool support arms on the frame arm intermediate its pivoted end and its free end, means on the base directly engageable with a blade carried by the work support for effecting rotation of the work support, and means responsive to reciprocation of the slide for effecting swinging movement of the tool support arms to accommodate the tapering width of the leading edge of the blades.

It is a further object of the present invention to provide a machine as described in the preceding paragraph including feed means engageable with the free end of the frame arm for effecting movement thereof in timed relation with reciprocation to feed the tools the predetermined depth with respect to blades in the work holder.

Other objects and features of the invention will become apparent as the description proceeds, especially when taken in conjunction with the accompanying drawings, wherein:

Figure 1 is a front elevation of a blade of the type for which the present machine was developed.

Figure 2 is a plan view of the blade shown in Figure 1.

Figure 3 is a side view of the blade shown in Figure 1.

Figure 4 is a diagrammatic view illustrating the relative position between a blade and cutting tool.

Figure 5 is a fragmentary sectional view showing the relationship between the leading edge of a blade and the pair of cutting tools at the large end of the blade.

Figure 6 is a view similar to Figure 5 at the small end of the blade.

Figure 7 is a fragmentary elevational view partly in section, of the machine for producing the blended curved leading edge surface on the blades.

Figure 8 is a fragmentary sectional view showing a work engaging roller.

Figure 9 is a view of a modified blade.

Figure 10 is a view of modified apparatus for finishing the leading edge of the type blade shown in Figure 9.

Jet engines are provided with high speed rotors having a plurality of blades thereon. These blades, indicated generally at 10 in Figures 1–3, may have a base 12 including a portion 13 called a "Christmas Tree" adapted to be inserted in a correspondingly shaped groove in the rotor. The blade portion indicated at 14 is concavo-convex as best illustrated in Figure 2, and is of an air foil section including a smoothly rounded leading edge 16. As indicated at the outset, these blades are rotated at extremely high velocities and it is of the utmost importance that the leading edge constitute a smoothly blended curved surface. The exact shape of the surface of the leading edge is not critical but it must be smoothly curved and the curves must blend smoothly into adjacent surfaces. In addition, the blade portion 14 is of tapered thickness, being of a maximum thickness adjacent the base 12 and of a minimum thickness adjacent the free end of the blade portion.

In accordance with the present invention, the leading edge of the blade portion 14 is machined by a pair of cutting tools 20 which are also illustrated in Figures 5 and 6. The cutting operation is similar to a shaping operation. The face of the cutting tools, as indicated at 22 in Figure 4, inclines rearwardly from the cutting edge, or in other words is provided with positive rake. As a result of this, the cutting edge proper, as indicated at 24, may cut right up to the surface 26 of the base 12.

Inasmuch as the leading edge of the base is of tapered thickness, a section taken adjacent the base 12 will appear as in Figure 5, whereas a section taken adjacent the free end, where the blade is relatively thinner, appears as in Figure 6. In order to provide smoothly rounded corners 28 and at the same time to cause these smoothly rounded corners to blend into the end surface 30 and the side surfaces 32 and 33, the tools or cutters are provided with concave substantially arcuate cutting edges 24. Conveniently, the arcuate cutting edges 24 may be of approximately 90 degrees' angular extent.

The blade portion 14 of the blades 10 is longitudinally twisted in addition to being longitudinally tapered, and as a result its leading edge is generally helical. The leading edge may or may not be a theoretically true helix but in most cases, it occupies an imaginary cylinder. Accordingly, to machine the corners of the leading edge as indicated in Figures 5 and 6, three separate relative motions are required. In the first place, a relative motion between the blade portion 14 and the tools 20 longitudinally of the leading edge is required. Due to the inclined or helical disposition of the leading edge of the blade, a relative rotation between the blade and the tools is required about an axis equivalent to the axis of the helix of the leading edge of the blade. Finally, as a consequence of the tapered nature of the blades, relative approach and separation between the tools 20 is required in timed relation to the relative reciprocation. A fourth relative motion is also required; namely, a feeding movement which is equivalent to a movement of the tools 20 in the direction of the arrow 36, relative to the blade portions 14 as seen in Figure 5.

Referring now to Figure 7 there is illustrated a machine for carrying out the operation suggested above. The machine comprises a stationary base 40 having longitudinally extending ways 42 thereon in which is mounted a reciprocating work slide 44. Located in a recess 46 in the base is an eccentric driver 48 connected by a link 50 to the slide 44 to effect reciprocation thereof in a direction perpendicular to the plane of the figure.

Mounted on the slide 44 is work support means including a stock member 52 on which is pivotally secured a rotary work holder 54 adapted to carry a blade 10 with the axis of the helically disposed leading edge coincident with the axis of rotation of the rotary work holder 54. Also carried by the slide 44 are a pair of adjustable camming members 56 and 58. These members may be angularly adjustable about vertical axes to dispose the inner camming surfaces 60 thereof at the required angle with respect to the path of reciprocation of the slide so as to produce the required camming of the tools to accommodate the tapered width of the leading edge of the blades 10.

Carried by the base 40 is a longitudinally adjustable elongated element 62 which may conveniently be threaded into a hole in the base for longitudinal adjustment and is provided with a knurled head 64. At its inner end the elongated member 62 carries a roller 66, as best seen in Figure 8. As shown in this figure, the roller 66 may be a ball received in a socket at the end of the member 62 and retained therein by the peened over lip portions 68. The ball 66 is adapted to engage one side of the blade portion 14 adjacent its leading edge and hence, substantially remote from the axis of the helix thereof.

At the opposite side of the base 40 is a cylinder 70 having a spring 72 therein and a piston 74 against which one end of the spring 72 engages. A piston rod 76 is provided which extends through an opening 78 in the base and terminates in a reduced portion 80 having a second roller 82 which may be in the form of a ball identical with the ball 66. The roller 82 engages the concave side of the blade portion 14 directly opposite the roller 66 and hence, due to the force of the spring 72, presses an edge portion solidly against the roller 66. The interior of the cylinder 70 communicates through a passage 84 with suitable air supply so that when air is admitted the piston 74 is moved against the spring 72 to retract the roller or ball 82 from the blade portion 14.

From the description it will be apparent that as the slide 44 reciprocates in a direction parallel to the axis of the rotary work holder 54, the engagement between the rollers or balls 66 and 82 and opposite sides of the twisted or generally helically disposed edge portion of the blade, will result in appropriate rotation of the work holder 54 to maintain the leading edge thereof uppermost, as seen in the figure.

Carried by the base 40 is a frame arm 90 pivoted at one end to the base 40, as indicated at 92, and having its other end adapted to move vertically as will subsequently be described. Carried intermediate the pivoted and free end of the frame arm 90 are a pair of tool support arms 94 and 96. As shown in the figure, these arms are pivoted at their upper ends on a common axis provided by a pivot pin 98 which extends parallel to the axis of the work holder. The tool support arms 94 and 96 are of substantial length and adjacent the lower ends thereof carry tool holders 100 and 102 respectively. These tool holders are preferably adjustable as indicated and carry the tools 20 previously referred to. The tools 20 are preferably of a suitable hard cutting material such for example as tungsten carbide.

Preferably, tool support arms 94 and 96 are pivoted from a block 104 which is adjustable longitudinally of an opening 106 provided in the frame arm 90 which is adapted to be locked in adjusted position by clamp screws 108 extending through elongated recesses 110 in the frame arm 90.

The tool support arms 94 and 96 are each provided with a laterally extending lug 112 which carries a roller 114 engageable with the surface 60 of the adjacent camming member 56 or 58. Accordingly, as the slide 44 is reciprocated, the arms 94 and 96 are controlled in separation and approach by the camming surfaces 60 engaging the rollers 114. If desired, suitable means may be provided urging the arms 94 and 96 apart so as to maintain the rollers 114 always in firm engagement with the camming or sine bar surfaces 60.

At the side of the machine there is provided a vertically slidable feeding member 120 at the lower end of which is provided suitable feeding means such for example as an eccentric actuated in step-by-step relation in timed relation to rotation of the crank or eccentric 48. Preferably, the arrangement is such that at the end of each complete reciprocation, the feeding member 120 is moved downwardly by a small increment to effect a downward adjustment to the tools 20 for the next succeeding cut on the blade portion 14. Preferably, following feed to full depth, a number of finishing strokes without further feed may be provided. At the upper end the feeding member 120 is provided with a quick releasable connection indicated generally at 122, with the free end of the frame arm so that the free end of the frame arm may be disconnected from the feeding member 120 and swung upwardly to provide access for loading and removing blades from the machine.

It will of course be appreciated that swinging movement of the arm 94 will be required during reciprocation of the slide 44 only because of the variable curvature of the convex side of the blade, and the relative approach and separation necessary to accommodate the tapered formation of the blade portion is accomplished primarily by swinging movement of the tool support arm 96.

It will also be observed that the actual approach and separation between the tools 20 is accomplished by means entirely independent of the blade. On the other hand, the rotation of the blade which is necessary to maintain its leading edge portion in the operating zone between the cutting tools 20 is accomplished by means engageable directly with the blade. This is an important consideration, since the exact shape of these blades is arrived at experimentally and the blades may not conform precisely to a geometrical figure. Accordingly, by employing the surfaces of the blades themselves as the means for guiding the work holder in rotation, it is possible to produce an accurate positioning of the leading edge of the work holder independent of any irregularities or variations in the precise shape of the surfaces of the blades.

As a result of the foregoing, the provision of the rounded corners at the leading edge of the blade is an operation which produces these rounded corners and blends the surfaces into the adjacent surfaces without attempting to produce any variation in the form of the blade itself. Thus for example, if the leading edge of the blade includes two portions extending at different helix angles, this will not interfere with the operation of the machine, since the blade is moved automatically to the proper position relative to the tools to effect proper rounding of the corners of the leading edge irrespective of the actual shape of the blade.

While relative approach and separation between the tool holders is illustrated as accomplished by means entirely independent of the blades, it is also within the contemplation of the present invention to provide a support for the tool holder 102 which is movable in accordance with movement of the portion 80. As the roller 82 moves away from the roller 66 in accordance with the thickness of the portion of the blade intermediate the rollers, the tool or cutter 20 will automatically be retracted a corresponding amount.

Referring now to Figure 9 there is illustrated a blade having a base 130 and a blade portion 132, the leading edge 134 of which is circumferentially or transversely curved as a result of the twisting of the blade, but the leading edge does not occupy an imaginary cylinder. In some cases the leading edge 134 of the type blade shown in Figure 9 may occupy the surface of a cone. This however, is not essential and the leading edge may not have any particular geometrical configuration except that different portions thereof are located different radial distances from the axis of the blade, the axis being illustrated in the figure at 136.

In order to finish the leading edge 134 of a blade, the apparatus illustrated in Figure 10 is provided. This apparatus is basically the same as that illustrated in Figure 7 and like reference numerals have been applied to corresponding parts. Only the features of difference will be described in connection with Figure 10. In this figure there is provided a vertically movable slide 140 which extends upwardly and connects to the slide 142 which is provided with quick release means 122 for connection to the horizontally extending frame arm 90. At the lower end of the slide 140 is provided a cam following roller 144 which is engageable with a rotary cam 146 driven by a shaft 147 carrying a bevel pinion 148 which meshes with a bevel gear 149 secured to the vertically extending shaft 150 which drives the eccentric driver 48. Accordingly, the cam 146 is rotated in timed relation to rotation of the eccentric driver 48, and specifically, with the 2 to 1 relationship illustrated the cam 146 makes one revolution during a forward stroke of the slide 44 and a second reciprocation during the return stroke of the slide 44. Thus, a predetermind rise and fall may be imparted to the arm 90 during the forward stroke and duplicated on the return stroke. For continuous rise during the forward stroke and corresponding fall during the return stroke it may be desirable to provide an arrangement in which the bevel gearing operates at a 1 to 1 ratio.

If desired to retain the function of incremental feed following each cutting stroke, incremental feeding means of conventional type may be employed to effect the feed specifically between slide members 140 and 142.

The drawings and the foregoing specification constitute a description of the improved machine for producing blended curved surfaces on the longitudinally tapered helically disposed leading edge of blades used in jet engines and the like, in such full, clear, concise and exact terms as to enable any person skilled in the art to practice the invention, the scope of which is indicated by the appended claims.

What I claim as my invention is:

1. Apparatus for producing blended curves on the longitudinally tapered, curved leading edges of blades comprising a base, a work slide mounted for rectilinear reciprocation on said base, a rotary work support on said slide having its axis parallel to the path of reciprocation of said slide, said work support comprising means for supporting a blade with the axis of its curved leading edge coincident with the axis of rotation of said work support, tool holders for supporting a pair of tools having concave cutting edges in position to engage the corners of the leading edge, means for reciprocating said slide, a fixed abutment having a roller engageable with one side of a blade in said work support remote from its axis of rotation, a yieldable member including a roller engaging the opposite side of the blade to press the blade against said fixed abutment, and tool adjusting means responsive to reciprocation of said slide to move said tool holders toward and away from each other to accommodate the tapered width of the leading edge of the blade.

2. Apparatus for producing blended curves on the longitudinally tapered, curved leading edges of blades comprising a base, a work slide mounted for rectilinear reciprocation on said base, a rotary work support on said slide having its axis parallel to the path of reciprocation of said slide, said work support comprising means for supporting a blade with the axis of its curved leading edge coincident with the axis of rotation of said work support, tool holders for supporting a pair of tools having concave cutting edges in position to engage the corners of the leading edge, means for reciprocating said slide, means responsive to reciprocation of said slide to rotate said work support to cause the curved leading edge to pass between tools in said tool holders, a frame arm pivoted at one end on said base and extending transversely across the path of reciprocation of said slide, a pair of tool support arms pivoted to said frame arm and extending toward the path of the blade, means on said tool support arms supporting said tool holders, and adjustable cam means on said base controlling swinging of said tool support arms.

3. Apparatus for producing blended curves on the longitudinally tapered, curved leading edges of blades comprising a base, a work slide mounted for rectilinear reciprocation on said base, a rotary work support on said slide having its axis parallel to the path of reciprocation of said slide, said work support comprising means for supporting a blade with the axis of its curved leading edge coincident with the axis of rotation of said work support, tool holders for supporting a pair of tools having concave cutting edges in position to engage the corners of the leading edge, means for reciprocating said slide, means responsive to reciprocation of said slide to rotate said work support to cause the curved leading edge to pass between tools in said tool holders, a frame arm pivoted at one end on said base and extending transversely across the path of reciprocation of said slide, a pair of tool support arms pivoted to said frame arm on a common pivot axis and extending toward the path of the blade, means on said tool support arms supporting said tool holders, and adjustable cam means on said base controlling swinging of said tool support arms.

4. Apparatus for producing blended curves on the longitudinally tapered, curved leading edges of blades comprising a base, a work slide mounted for rectilinear reciprocation on said base, a rotary work support on said slide having its axis parallel to the path of reciprocation of said slide, said work support comprising means for supporting a blade with the axis of its curved leading edge coincident with the axis of rotation of said work support, tool holders for supporting a pair of tools having concave cutting edges in position to engage the corners of the leading edge, means for reciprocating said slide, means responsive to reciprocation of said slide to rotate said work support to cause the curved leading edge to pass between tools in said tool holders, a frame arm pivoted at one end on said base and extending transversely across the path of reciprocation of said slide, a pair of tool support arms pivoted to said frame arm and extending toward the path of the blade, means on said tool support arms supporting said tool holders, adjustable cam means on said base controlling swinging of said tool support arms, and means for adjusting the other end of said frame arm in timed relation to reciprocation of said slide to control feed of said tool holders.

5. Apparatus for producing smoothly rounded corners between the leading edge and the sides of a blade of longitudinally tapered thickness comprising a base, a work support on said base, tool support and work guide structure on said base, means on said work support mounting a blade for rotation about its longitudinal axis, means for effecting relative traverse between said support and structure parallel to the axis of rotation of said work support, said structure comprising a pair of elements engageable at opposite sides of a blade on said support remote from its longitudinal axis to rotate the blade during relative traverse, one of said elements being mounted for movement toward and away from the other, and a pair of tools having concave arcuate cutting edges movable on said structure toward and away from the leading corner edges of a blade on said support, cam means fixed relative to said work support, and cam followers connected to said tools.

(References on following page)

References Cited in the file of this patent

UNITED STATES PATENTS

| | | |
|---|---|---|
| 850,144 | Dunbar | Apr. 16, 1907 |
| 1,667,064 | Yerkey | Apr. 24, 1928 |
| 1,789,544 | De Vlieg | Jan. 20, 1931 |
| 1,867,995 | Arenz | July 19, 1932 |
| 1,875,547 | Anderson | Sept. 6, 1932 |
| 2,737,856 | Creek et al. | Mar. 13, 1956 |
| 2,741,164 | Smedley | Apr. 10, 1956 |

FOREIGN PATENTS

| | | |
|---|---|---|
| 883,863 | Germany | July 20, 1953 |
| 937,449 | Germany | Jan. 5, 1956 |